No. 871,564. PATENTED NOV. 19, 1907.
G. E. BROWN.
TETHER PIN.
APPLICATION FILED JAN. 28, 1907.

Witnesses

Inventor
Gilman E. Brown.
By
Attorneys

UNITED STATES PATENT OFFICE.

GILMAN E. BROWN, OF SANDOWN, NEW HAMPSHIRE.

TETHER-PIN.

No. 871,564.

Specification of Letters Patent.

Patented Nov. 19, 1907.

Application filed January 28, 1907. Serial No. 354,633.

*To all whom it may concern:*

Be it known that I, GILMAN E. BROWN, a citizen of United States, residing at Sandown, in the county of Rockingham, State of New Hampshire, have invented certain new and useful Improvements in Tether-Pins; and I do hereby declare the following to be a full, clear, and exact description of the invention, such as will enable others skilled in the art to which it appertains to make and use the same.

This invention has relation to pins, stakes, or other devices for tethering stock, such as cows and horses in fields, lanes, parks, etc., so as to limit the extent of land surface over which they may pasture.

It is the object of the invention to provide a tether-pin or stake with improved means that will strengthen the tethering arms and allow of the tether chain, strap or rope to be dragged around and over it without catching upon it so as to become entangled with it or knotted or twisted in a way that will interfere with its complete functions.

The nature of the invention is to be ascertained from the device portrayed in the annexed drawings, forming a part of this specification, in view of which it will first be described with respect to its construction and mode of employment, and then pointed out in the subjoined claims.

Figure 1:
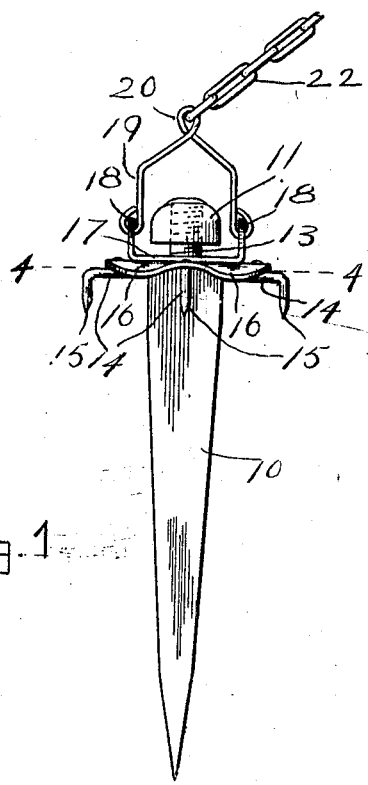
Figure 2:
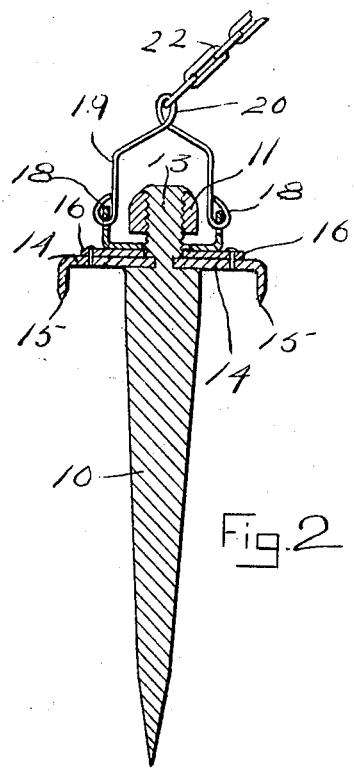
Figure 3:
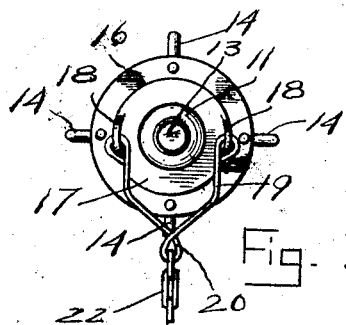
Figure 4:
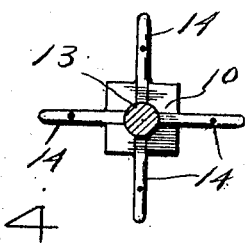

Of the said drawings—Figure 1 is a side view of the invention. Fig. 2 is a central vertical sectional view. Fig. 3 is a plan. Fig. 4 is a horizontal section in the plane 4—4, Fig. 1.

Similar numerals of reference designate similar parts or features, as the case may be, wherever they occur.

In the drawings, 10 designates the pin, which, merely for the sake of indicating dimensions suitable in some cases, may be supposed to be fifteen inches in length.

11 designates the head of the pin and 13 the reduced neck formed on the upper end of the body, or pin proper, the said neck being exteriorly threaded and fitted in a threaded socket formed through the head.

14 designates arms that are connected with the tether-pin 10, and extend horizontally and radially therefrom. The end portions of the said arms are bent down at a right angle to the arms and are sharpened at their terminals so as to facilitate the driving of them into the ground to anchor the arms.

16 is a plate or washer provided centrally with an opening fitting around the neck, and which at its edges between the arms is bent downward, said washer being riveted to the arms to strengthen and maintain the latter in position. This is an important feature of the invention, since by this construction and arrangement of parts, the tether-chain will be kept from catching on the arms and displacing them, and from itself being retarded or held back from freely passing over the arms.

17 designates a bail-plate also fitted to turn on the neck 13 above the plate, 16, and provided on opposite sides at its edge with perforated ears 18 in which the ends of a bail 19 are secured, said bail being provided with an eye 20, at a central point over the axis of the pin and its head when the bail is raised.

22 designates a short piece of a chain connected with the eye 20 of the bail 19, which chain constitutes a part of the tether for tying the animal, though said tether may be composed of a strap or other means suitable to the purpose.

A suitable mallet or other means may be used for driving the pin into the ground and pulling it out therefrom.

It is to be noted that the device affords a most efficient means, not only for securing the pin firmly in place, but also for allowing the tethered animal to travel around and over the pin, dragging the chain or rope about the same without having it become entangled with the pin or knotted or tangled by engagement therewith.

By forming the arms 14 with the rightangular terminals 15 the latter can be driven into the ground when the pin proper is driven, and by a blow or two on the top of each arm it can be sunk into the earth even with its surface, so that it is not essential to bury the upper portion of the device in the earth as would be necessary if the arms curved downward from the connection of their shanks with the pin 10. The washer plate 16, as before stated, protects the arms from being acted upon by the tether chain.

What is claimed, is—

A tether-pin provided with horizontally-extended radial arms at its upper end, the free end portions or terminals of the arms being bent down at right angles to the arms to engage the ground, a neck at the upper end of the pin, a head upon the neck, a washer plate on the neck above the said arms, riveted thereto and bent downward between the arms, a bail-plate pivotally engaged with said neck, a bail pivoted to the bail-plate, and a tether connected to the bail as shown and described.

In testimony whereof, I affix my signature, in presence of two witnesses.

GILMAN E. BROWN.

Witnesses:
 FRANK L. BROWN,
 PHILENA F. BARTLETT.